(12) United States Patent
Lee

(10) Patent No.: US 7,293,000 B2
(45) Date of Patent: Nov. 6, 2007

(54) INFORMATION INTEGRATION METHOD FOR DECISION REGULATION IN HIERARCHIC DECISION SYSTEMS

(76) Inventor: Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 993 days.

(21) Appl. No.: 10/081,441

(22) Filed: Feb. 22, 2002

(65) Prior Publication Data

US 2003/0163437 A1 Aug. 28, 2003

(51) Int. Cl.
*G06F 15/18* (2006.01)

(52) U.S. Cl. .............. 706/12; 706/14; 706/46; 706/48

(58) Field of Classification Search .......... 706/12, 706/14, 46, 48
See application file for complete search history.

(56) References Cited

U.S. PATENT DOCUMENTS 6,678,669 B2 * 1/2004 Lapointe et al. .......... 706/15
2001/0023419 A1 * 9/2001 Lapointe et al. .......... 706/15
2003/0074250 A1 * 4/2003 Burk .......... 705/10
2003/0172043 A1 * 9/2003 Guyon et al. .......... 706/48

OTHER PUBLICATIONS

Breiman L., Friedman J. H., Olshen R. A. and Stone C. J., "Classification And Regression Trees", Chapman &Hall/CRC, 1984, pp. 59-92.
John H. George "Robust Decision Trees: Removing Outliers from Databases", in Processdings of the First International Conference on Knowledge Discovery and Data Mining, Fayyad and Uthurusamy Eds, AAAI Press. pp. 174-179. 1995.
Quinlan J. R., "C4.5 Programs For Machine Learning", Morgan Kaufmann, 1993, pp. 35-44.

* cited by examiner

*Primary Examiner*—Joseph P Hirl

(57) ABSTRACT

A decision regulation method separates noise from consistent application domain characteristics and integrates multiple types of information to create robust decisions that work well for the application in spite of the application dynamics and/or errors in training data. Adjustment is made between a local and global decision basis to yield a balance point to match the application. Unequal class prevalence of the training data is compensated. The decision tree generation process is also regulated using information integration. Reliability measures and new pruning methods are taught for optimization of hierarchical decision structures.

13 Claims, 2 Drawing Sheets

INFORMATION INTEGRATION METHOD FOR DECISION REGULATION IN HIERARCHIC DECISION SYSTEMS

TECHNICAL FIELD

This invention relates to information integration for regulating hierarchic decision systems.

BACKGROUND OF THE INVENTION

Many decision system applications such as data mining, automatic process control, automatic target recognition, intelligent search, and machine vision perform decision making using rules derived from offline training or online learning. Decision rules encapsulate the knowledge acquired from the application and transform it into recipes to make decisions on new data. Decision rules are responsive to the training data used to create them. However, they do not necessarily yield robust performance in the application they were intended to service. General decision rules that are domain independent generally do not perform well. Yet, expert systems that are highly domain specific are frequently not robust to changes and variations.

Many prior art approaches can be used for decision rule generation. These include knowledge acquisition methods in expert systems, statistical discriminate analysis, Bayesian decision theory, Bayesian belief networks, fuzzy systems, artificial neural networks, genetic algorithms, etc. Several of the approaches are capable of generating complicated rules to optimize decisions for the training data and yield superior re-substitution (test on training data) results.

In simple applications, almost all the above referenced prior art approaches could result in reasonable performance. However, due to the dynamic nature of many applications, unforeseen conditions or data are often encountered in the field that challenge the decision rules created without the benefits of the new information. Furthermore, errors in the training database can be very common due to incorrect data entry, mislabels, incorrect truth, or measurement errors. Decision rules specifically optimized for the training data may fail on the new data due to dynamic application situations or training data errors. Thus, they frequently lack robustness.

To overcome the difficulty of non-robust performance, prior art methods divide available data into training and testing sets. They use the training set to generate decision rules and use the test set to assess and guide the decision rule generation process from the training. This approach can improve the robustness of the decision rules. However, it is inefficient since it generates decision rules from only partial data and it fails to utilize all data within small training data sets, giving rise to the condition of insufficient training. Furthermore, they cannot effectively deal with outliers created by errors in the training database.

The decision tree is a popular prior art decision approach. It makes decisions through a hierarchical decision procedure that implements a divide-and-conquer strategy. Prior art decision tree classifiers address the robustness problem using a pruning scheme (J. H., Olshen R. A. and Stone C. J., "Classification And Regression Trees", Chapman & Hall/CRC, 1984, pp 59-62; Quinlan J. R., "C4.5 Programs For Machine Learning", Morgan Kaufmann, 1993, pp 35-43; John H. George "Robust Decision Trees: Removing Outliers from Databases", in Proceedings of the First International Conference on Knowledge Discovery and Data Mining, Fayyad and Uthurusamy Eds, AAAI Press, PP. 174-179, 1995). This was an attempt to remove the effect of outliers from the training data. However, they have not been shown to consistently achieve higher accuracy. A prior art invention (Lee Shih-Jong J. "Method for Regulation of Hierarchic Decisions in Intelligent Systems", U.S. patent application Ser. No. 09/972,057, filed Oct. 5, 2001) regulates the decision rules to respond appropriately to uncertainty. It automatically adjusts the operating characteristic between crisp and soft decisions to match the application. It provides automatic optimization of decision rules by assessing the robustness and generalization of the decisions.

However, the above decision tree based prior art relies on local data assessment in nodes deep in the tree. The local data inherently hinders the proper separation of noise from the application domain's consistent characteristics. Local data only represents partial information of the data distribution. Local nodes with small numbers of samples could contain outliers yet in many cases they contain data bearing consistent characteristics. The discrimination between noise and real signal cannot be simply determined based on the local information. Furthermore, prior art terminal node class assignment is based on the relative counts of training samples from different classes. Unequal prevalence of training samples from different classes can significantly impact the classification result.

OBJECTS AND ADVANTAGES

This invention provides a decision regulation method that separates noise from consistent application domain characteristics and integrates multiple types of information to create robust decisions that work well for the application in spite of the application dynamics and/or errors in training data. One object of the invention is to automatically compensate for unequal class prevalence of the training data. Another object of the invention is to enable adjustment between a local and global decision basis to yield a balance point to match an application. A third object is to regulate the decision tree generation process by information integration. Still other objects are to provide reliability measures, and new pruning methods for automatic optimization of hierarchic decision structures.

Advantages include the removal of noise from the decision process and integration of local information and consistent global information for decisions. This invention automatically compensates for unequal class prevalence of the training data. This invention enables the adjustment between local and global decision basis to yield an improved decision basis to match the application. This invention integrates the available information to improve decisions and to minimize the amount and quality of training data required. This invention allows for automatic optimization of hierarchical decision structures generated from other approaches.

SUMMARY OF THE INVENTION

Incorporating global information and local information in making decisions at a node regulates decision characteristics in hierarchic decision systems. It also compensates for the prevalence difference of different training classes. This regulation method decreases noise and increases accuracy. Conventional crisp decision tree construction can realize significant improvement in robustness if the pruning process incorporates information integration of the invention. Regulated decision systems can also use integrated confidence values or reliability measures as their evaluation function when partitioning data at a node.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

I. Decision Tree

A decision tree makes a decision through a hierarchical decision structure implemented as a tree. A tree consists of at least one non-terminal node and at least as many terminal nodes as the number of decision outcomes to be decided. Each outcome has associated at least one terminal node, and the non-terminal nodes represent various collections of mixed outcomes. The root node represents the entire collection of outcomes into which a new sample may be decided.

Almost all decision trees are binary decision trees where each non-terminal node branches out two descending nodes. Without loss of generality, we use binary decision tree classifiers in the descriptions of this invention. Those skilled in the art should recognize that the method of this invention is applicable to other type of decision trees or other types of parametric or non-parametric decision methods.

I.1 Binary Decision Tree Classifier

Figure 1:
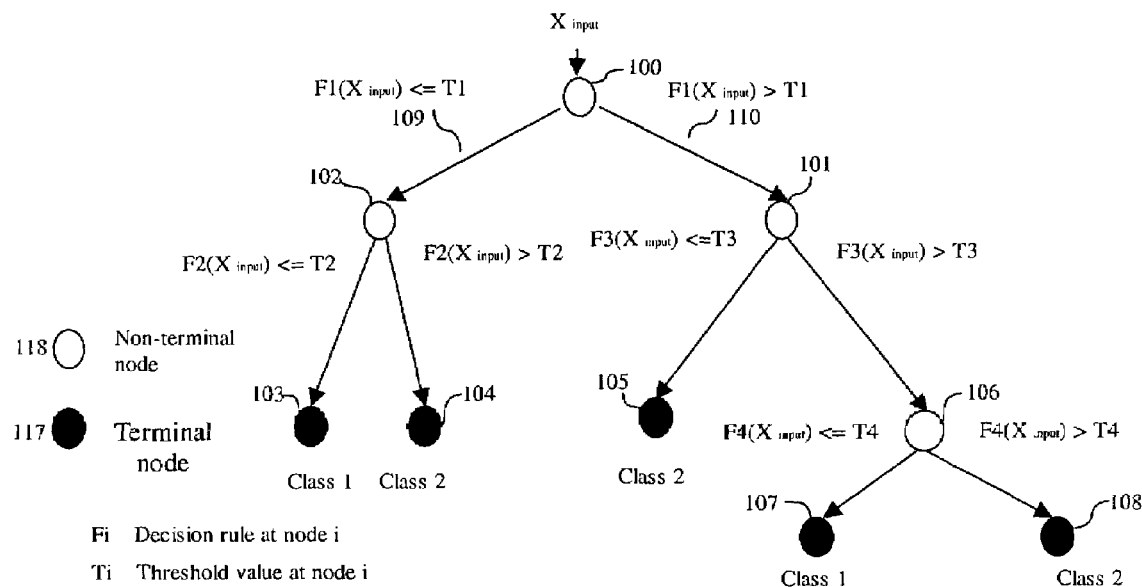
FIG. 1 shows the computational structure of a typical binary decision tree classifier.

FIG. 1 shows a typical binary decision tree classifier. A binary decision tree has two descendant paths (e.g. 109, 110 for node 100) for each non-terminal node. There is a decision rule associated with each non-terminal node to determine the descendant path for a sample at the node, until a terminal node is reached. The decision outcomes of a decision tree classifier 103, 104, 105, 107, 108 are classes associated with the input data. Examples of classes include disease types, defect classifications, weather patterns, etc.

In the classification mode, an unknown sample enters the decision tree at the root node 100 and the decision rule associated with the root node 100 is applied to the sample's feature vector to determine the descendant path that the sample will follow. This process is repeated until a terminal node 117 is reached. Every terminal node has an associated class to which the sample is assigned.

The commonly used decision rule at each non-terminal node 118 is thresholding of a discrimination function value at the node. If the node's discrimination function value is less than or equal to a threshold value, the left child is taken; otherwise, the right child is taken for the descendant path. Feature thresholding is the simplest yet most easily understandable discrimination function. It selects a feature and uses its value to compare to a predetermined threshold. Other discrimination functions such as Fisher linear decision function, Bayes linear decision function, Bayes quadratic decision function and other single stage decision rules can also be used. Note that it is harder to interpret a decision tree when multiple features are involved in a discrimination function.

I.2 Binary Decision Tree Construction Procedure

Given a set of training samples, a binary decision tree can be constructed automatically by a divide and conquer procedure. All training samples are used to construct the root node. Each subsequent node is trained by a subset of the training samples. The decision tree construction procedure is as follows:

1. For a given node n with associated training sample set $U^n$, sort the samples in an ascending order according to their discrimination function values, i.e.

$$f(X_k^n) \leq f(X_{k+1}^n).$$

In the case of a feature thresholding method, the sorting is performed for each of the available features. So that both feature and threshold value selection can be accomplished simultaneously.

2. A set of candidate thresholds $T^n$ is defined by:

$$T^n = \left\{ \frac{f(X_k^n) + f(X_{k+1}^n)}{2} \middle| \text{Class}^{k+1} \neq \text{Class}^k \right\}$$

3. For each partition at a candidate threshold, calculate the following parameters:

the weighted number of class c samples assigned to LEFT, $N_{Lc}$, and the weighted number of class c samples assigned to RIGHT, $N_{Rc}$.

$$N_{Lc} = \sum_{i \in \text{Class\_c\_in\_LEFT}} w_i^c$$

$$N_{Rc} = \sum_{j \in \text{Class\_c\_in\_RIGHT}} w_j^c$$

Where $w_i^c$ is the weighting factor for sample i that belongs to class c.

The total weighted number of samples assigned to LEFT and RIGHT by the partition:

$$N_L = \sum_{c \in \text{LEFT}} N_{Lc}$$

$$N_R = \sum_{c \in \text{RIGHT}} N_{Rc}$$

Evaluation functions to be used for the partition selection at node n include:

Purity (Entropy):

$$PR_n = \sum_{c \in all\_Class\_in\_n} (N_{Lc}\ln P_{Lc} + N_{Rc}\ln P_{Rc})$$

where $$P_{Lc} = \frac{N_{Lc}}{N_L} \text{ and } P_{Rc} = \frac{N_{Rc}}{N_R}.$$

Purity has the maximum value when the training samples are completely separated in LEFT and RIGHT.

Other criteria that can be used for the evaluation function include the probability of correct classification.

4. Select the partition for node n as the one that maximizes the evaluation function.
5. Check the following stopping criteria (OR conditions):
    Reached the maximum allowable level of tree: $L=\log_2 N-1$ or a user specified limit. Where N is the total number of training samples.
    $\chi^2$ value is smaller than an allowable limit.
    Where $$\chi^2 = \sum_{c \in all\_Class\_in\_n} N_{Lc}\ln P_{Lc} + N_{Rc}\ln P_{Rc} - N_c^n \ln \frac{N_c^n}{N^n} \text{ and } N_c^n$$

is the weighted number of samples of class c at node n. $N^n$ is the total weighted number of samples at node n.

$N^n$ value is smaller than an allowable limit.

Type I error>limit. Where type I error is the probability that a sample whose true class is in LEFT yet it is classified as RIGHT class.

Type II error>limit. Where type II error is the probability that a sample whose true class is in RIGHT yet it is classified as LEFT class.

6. If none of the stopping criteria is met, assign node n as a non-terminal node and use the step 4 selected partition for this node.
7. If at least one of the stopping criteria is met, assign node n as a terminal node, and assign the most probable class from its associated training samples.

I.3 Smooth Decision Tree Classifier

A typical decision tree classifier makes crisp decision. That is, it assigns a class unequivocally to an input sample. This method supports discontinuous decision boundaries well and is desirable in classification applications where context switching is required around decision boundaries. However, in applications that require generalization or in applications where the training samples cannot accurately predict decision boundaries or when the input samples are subject to noise and therefore perturb around the decision boundaries, a smooth decision around the decision boundary is desirable. A regulation tree can provide smooth decision boundaries. A regulation tree is disclosed in U.S. patent application Ser. No. 09/972,057, filed Oct. 5, 2001 and entitled "Regulation of Hierarchic Decisions in Intelligent Systems" by Lee, which is incorporated in its entirety herein.

I.3.1 Regulation Tree Construction

A regulation tree can be derived from an existing decision tree. The regulation tree has the same structure as the existing decision tree, but it derives and stores additional statistics at each node. The regulation tree construction process inputs a decision tree and a set of training samples. The training samples can be the same training samples used to derive the decision tree, but they do not have to be. The regulation tree construction process includes the following steps:

1. For each non-terminal $node_n$, determine the distance-to-threshold ($d_i$) values for each training sample i associated with this node. The weighted mean ($\mu_d i$) and standard deviation ($\sigma_{di}$) for the distance values are derived from the training sample distance values and stored in the node for the classification of new samples. The weighting factors are the weights associated with each training sample. Weights can be associated with samples on a variety of basis such as with the confidence of representation or accuracy of data acquisition, significance to a class determination, or other emphasis criteria. Equal weights can be applied if no additional information is available. A process such as tree focusing can also automatically determine weights. A simple method accumulates the weighted distance value using the following rule:

$$Distance(k + 1) = Distance(k) + w_{k+1} * d_{k+1}$$

$$Weight(k + 1) = Weight(k) + w_{k+1}$$

$$SquareDistance(k + 1) = SquareDistance(k) + w_{k+1} * d_{k+1}^2$$

After the accumulation of all training samples associated with the node, the mean distance $\mu_d$ can be derived by $$\mu_d = Distance/Weight$$

and the mean square distance $$s_d^2$$

can be derived by $$s_d^2 = SquareDistance/Weight$$

The distance standard deviation $\sigma_d$ value can be derived by $$\sigma_d = \sqrt{s_d^2 - \mu_d^2}$$

To avoid the problem of outliers, an alternative embodiment of the invention can be derived by ranking $d_i$ and finding the weighted median value ($m_d$) and the range between the 10% and 90% values of the distance ($R_{10\%-90\%}$). The mean distance and the distance standard deviation can be estimated from $m_d$ and $R_{10\%-90\%}$ as follows:

$$\mu_d = m_d$$

$$\sigma_d = R_{10\%-90\%}/2.56$$

Those skilled in the art should recognize that other methods could be used to estimate the mean and standard deviation values. For example, different percentiles can be used to measure the range for the standard deviation estimation. Furthermore, the weights for each sample can all be set equal to one.

2. For a terminal node n having $N^n$ weighted training samples. Let $$N_c^n$$

be the weighted class c training sample count at this terminal node n. The likelihood value for class c at terminal node n can be determined as:

$$L_{\text{class\_c}}^n = N_c^n / N^n.$$

An alterative method for likelihood value calculation is:

$$L_{\text{class\_c}}^n = N_c^n / (N^n + \beta).$$

Where $\beta$ is a regulation parameter that weakens the likelihood values for terminal nodes having small number of training samples. The likelihood values are stored for each terminal node of the tree.

I.3.2 Regulation Tree Application

Given a new sample, $X_{input}$, the likelihood value at each non-terminal node n is determined first. To determine the likelihood value for a non-terminal node, the distance to threshold value is calculated as:

$$d_{input} = f_n(X_{input}) - T_n$$

Figure 2:
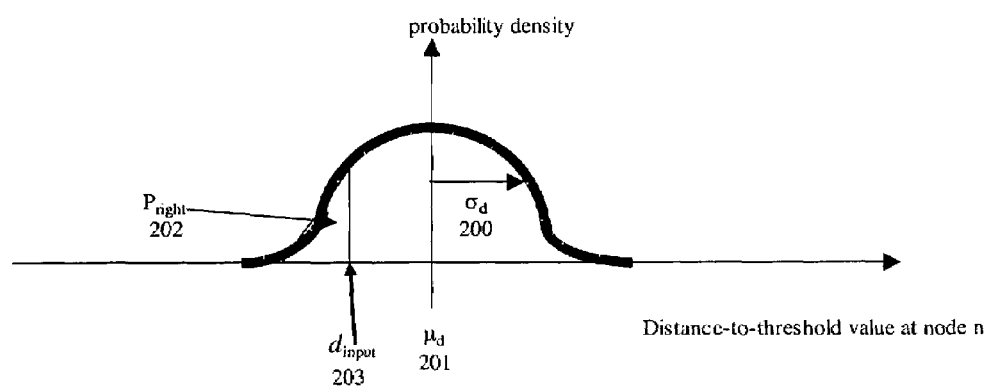
FIG. 2 shows the non-terminal node likelihood value determination process.

The likelihood value determination process is shown in FIG. 2. If distance value, $d_{input}$, is zero or negative, the likelihood value for descending through the LEFT branch, L_LEFT, is one in a crisp tree. For purposes of illustration, assume a Gaussian distance probability density function offset according to the mean value for $d_{input}$ and an absolute $d_{input}$ value that is zero or negative. Then, the probability that the sample could descend through the RIGHT branch $P_{right}$ 202 is calculated by $$P_{right} = \int_{-\infty}^{d_{input}} \frac{1}{\sqrt{2\pi}\,\sigma_d} e^{-\frac{(v-\mu_d)^2}{2\sigma_d^2}} dv$$

Where $\mu_d$ 201 is the mean of the distance probability density and $\sigma_d$ 200 is the standard deviation of the distance probability density.

The probability of being a sample that should descend through the LEFT branch is calculated as $$P_{left} = 1 - P_{right}$$

The likelihood value, L_LEFT, of the regulation tree for descending through the LEFT branch can be calculated as a linear combination of the crisp tree value (i.e. 1) and $P_{left}$ by a regulation parameter $\alpha$. That is, $$L_{left} = 0.5 + \alpha + (0.5 - \alpha) P_{left}$$

and $$L_{right} = 1 - L_{left}$$

If distance value, $d_{input}$, is positive, the likelihood value for descending through the LEFT branch, L_LEFT, and the likelihood value for descending through the RIGHT branch, L_RIGHT can be similarly determined.

Note that the $\alpha$ value regulates the crisp tree and probabilistic tree. When $\alpha=0.5$, the tree reverts to the original crisp tree. When $\alpha=0$, the tree averages the original crisp tree and a complete probabilistic tree with equal weight. When $\alpha=-0.5$, the tree is a complete probabilistic tree.

Since a sample ($X_{input}$) most likely has non-zero branch likelihood values for each of the terminal nodes, the confidence value that corresponds to class c for $X_{input}$, Confidence$_c(X_{input})$, can be determined by the following formula (see FIG. 3):

$$\text{Confidence}_c(X_{input}) = \sum_{j \in \text{terminal\_nodes}} \prod_{s \in \text{branches\_to\_j}} L\_s(X_{input}) L_{\text{class\_c}}^j$$

Figure 3:
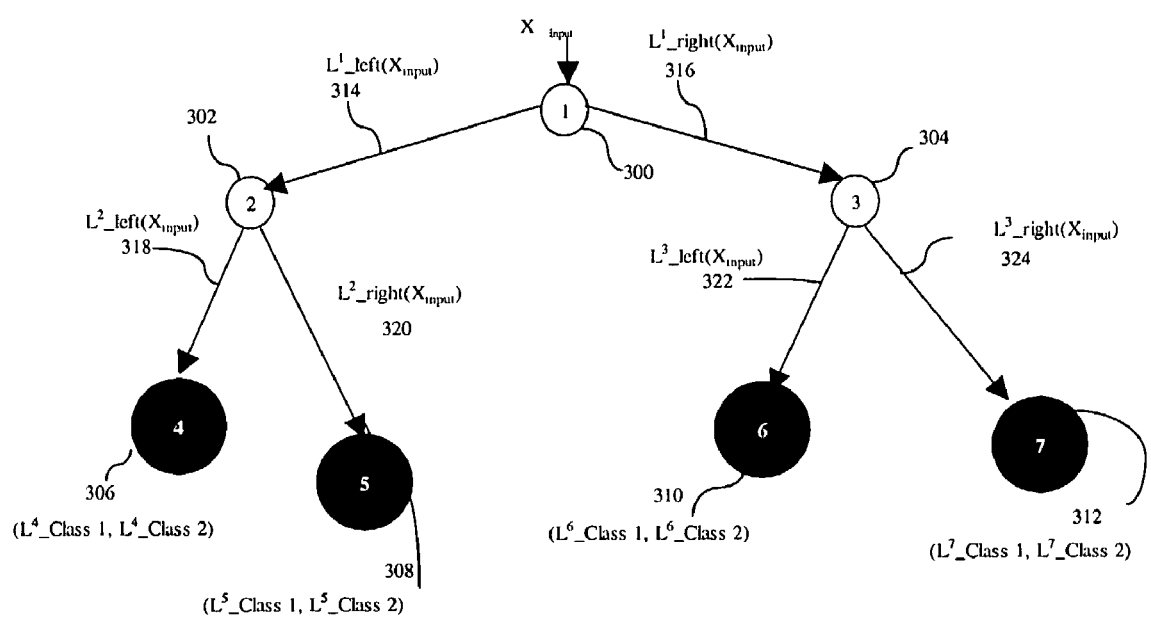
FIG. 3 shows the regulation tree class confidence value determination process.

FIG. 3 shows the example data for confidence determination diagrammatically for a tree having 3 non-terminal nodes 300, 302, 304 and 4 terminal nodes 306, 308, 310, 312 for classifying input samples into two classes, Class 1 or Class 2. For any input sample $X_{input}$ the likelihood values that it will pass down any branch of the tree can be determined as illustrated. For example, in FIG. 3 the likelihood that it will pass down branch 314 has been determined to be $L^1\_left(X_{input})$. In the FIG. 3 example, these likelihood determinations are labeled for each branch of the tree for the particular input sample. Determine that the new sample $X_{input}$ is in a particular class as:

$$\text{Confidence\_class1}(X_{input}) = L^4\_\text{class1} * L^2\_\text{left}(X_{input}) * L^1\_\text{left}(X_{input}) +$$
$$L^5\_\text{class1} * L^2\_\text{right}(X_{input}) * L^1\_\text{left}(X_{input}) +$$
$$L^6\_\text{class1} * L^3\_\text{left}(X_{input}) * L^1\_\text{right}(X_{input}) +$$
$$L^7\_\text{class1} * L^3\_\text{right}(X_{input}) * L^1\_\text{right}(X_{input})$$

$$\text{Confidence\_class2}(X_{input}) = L^4\_\text{class2} * L^2\_\text{left}(X_{input}) * L^1\_\text{left}(X_{input}) +$$
$$L^5\_\text{class2} * L^2\_\text{right}(X_{input}) * L^1\_\text{left}(X_{input}) +$$
$$L^6\_\text{class2} * L^3\_\text{left}(X_{input}) * L^1\_\text{right}(X_{input}) +$$
$$L^7\_\text{class2} * L^3\_\text{right}(X_{input}) * L^1\_\text{right}(X_{input})$$

where the likelihood value for each class is known for each of the terminal nodes and depicted for node 4 (306) as $L^4\_$Class 1 and $L^4\_$Class 2, node 5 (308) as $L^5\_$Class 1 $L^5\_$Class 2, node 6 (310) as $L^6\_$Class 1 and $L^6\_$Class 2 and node 7 (312) as $L^7_L{}^7\_$Class 2. The associated likelihood values determined for a particular input sample $X_{input}$ that are referred to in the equations above are $L^1\_\text{left}(X_{input})$ (314), $L^1\_\text{right}(X_{input})$ (416), $L^2\_\text{left}(X_{input})$ (318), $L^2\_\text{right}(X_{input})$ (320), $L^3\_\text{left}(X_{input})$ (322), $L^3\_\text{right}(X_{input})$ (324).

The classification process can be performed based upon the confidence determined for each input (Xinput). The classification result, C*, can be determined by the following rule $$C^*(X_{input}) = \arg \max_c Confidence_c(X_{input})$$

II. Decision Regulation Using Global and Population Characteristics

For a node n in a decision tree, prior art approach uses only $$N_c^n$$

the weighted class c training sample count at this node n to derive rules for classification or a node effectiveness estimate. The decision regulation approach of this invention uses additional information that characterize the global and population statistics of the training data for classification and node effectiveness estimation. In a preferred embodiment of the invention, up to four types of information are used for each node: local counts, local population statistics, global counts and global population statistics.

II.1 Global Characteristics and Population Characteristics

II.1.1 Local Counts

These include the same information as that of the prior art approach. They consist of $$N_c^n,$$

the weighted class c training sample count at a node n.

II.1.2 Local Population Statistics

These include $$P_c^n,$$

the weighted class c training sample proportion at a node n. Where $$P_c^n = \frac{N_c^n}{\sum_{i \in Class\_c\_in\_all\_training\_samples} w_i^c}$$

In the case that all classes have the same weighted training sample counts, the local counts and local population statistics contain basically the same information. However, when the weighted training sample counts are different for different classes, the $$P_c^n$$

will have higher relative value for classes with smaller training sample counts. Therefore, local population statistics provide a prevalence independent characterization of the node n. This information could be used to avoid the systematic misclassification of samples from low prevalence classes. This is especially important for correct rare event classification or correctly classifying the classes whose training samples are limited.

II.1.3 Global Counts

For each node n except the root node, there exists a parent node p. Let $f^p(x) \geq 0$ be the decision rule of node p that leads to node n when satisfied. Let $G^n$ be the global training sample set associated with node n. The global counts consist of $$G_c^n$$

the weighted class c training sample count for the samples in $G^n$ that satisfy the decision rule $f^p(x) \geq 0$. In one embodiment of the invention, $G^n$ is defined as the training samples that are up to k layers above node n. When k=1, $G^n$ includes the training samples in the parent node p, i.e. $G^n = U^p$. In this case, the global counts are identical to the local counts, that is $$G_c^n = N_c^n.$$

When k>1, additional samples above the parent node p are included. A larger k includes more global contexts of the node n. When k is sufficiently large, $G^n$ can include all training samples as its global context. Therefore the global context coverage can be adjusted using different layer depths.

Those skilled in the art should recognize that other methods of defining $G^n$ can be used in the invention. For example, a minimum number of training samples or a proportion of total samples rather than the layer k can be used to define the global training sample set $G^n$.

II.1.4 Global Population Statistics

These include $$g_c^n,$$

the weighted global class c training sample proportion at a node n.

$$\text{Where } g_c^n = \frac{G_c^n}{\sum_{i \in Class\_c\_in\_all\_training\_samples} w_i^c}$$

In the case that all classes have the same weighted training sample counts, the global counts and global population statistics contain basically the same information. However, when the weighted training sample counts are different for different classes, the $g_c^n$ will have higher relative value for classes with smaller training sample counts. Therefore, global population statistics provide a prevalence independent global characterization of the node n. This information is used to avoid the systematic misclassification of samples from low prevalence classes.

II.2 Classification Regulation by Information Integration

The global and population characteristics of this invention provide a framework for classification decision regulation that discriminates between noise and consistent application characteristics. It also allows a correction for prevalence discrepancy in the training data. In one embodiment of the invention, to regulate classification, a class confidence value is derived from each type of the characteristics for each terminal node. The confidence value for a class c is defined as the ratio between the characteristic value of the class c and that of all classes.

The local count confidence for class c in a terminal node n is defined as:

$$LC_c^n = \frac{N_c^n}{\sum_{c \in \text{All\_Classes\_in\_n}} N_c^n}.$$

Similarly, the local population confidence for class c in a terminal node n is defined as:

$$LP_c^n = \frac{P_c^n}{\sum_{c \in \text{All\_Classes\_in\_n}} P_c^n}.$$

The global count confidence for class c in a terminal node n is defined as:

$$GC_c^n = \frac{G_c^n}{\sum_{c \in \text{All\_Classes\_in\_n}} G_c^n};$$

and the global population confidence for class c in a terminal node n is defined as:

$$GP_c^n = \frac{g_c^n}{\sum_{c \in \text{All\_Classes\_in\_n}} g_c^n}.$$

In one embodiment of the invention, an integrated confidence value $$IC_c^n$$

for a class c in a terminal node is defined as a weighted combination of the class c confidence values by the following rule:

$$IC_c^n = a*LC_c^n + b*LP_c^n + c*GC_c^n + d*GP_c^n$$

Where a, b, c and d are weights for integration. The weights a, b, c and d allow for great flexibility in decision strategy that can be selected to suit an application. When b, c and d are set to 0, the integrated results degenerate to the prior art approach that relies solely on local counts. When a and c are set to 0, a new training class prevalence independent decision strategy is created. When c and d are set to 0, a training class prevalence corrected local based decision strategy is created. Similarly, when a and b are both set to 0, a training class prevalence corrected global based decision strategy is created. Furthermore, the global context coverage can be adjusted using different layer depth k as defined in II.1.3. This decision regulation approach allows the removal (or reduction) of noise from the decision process and integration of local and consistent global information for decisions. Those skilled in the art should recognize that other ways of confidence integration can also be used. For example, a nonlinear combination such as polynomial functions can be used in place of the linear combination.

In a crisp tree application embodiment of the invention, the regulated class assignment $c^{n*}$ for a terminal node n can be defined as $$c^{n*} = \arg\underset{c}{\text{MAX}}\, IC_c^n$$

In a smooth tree application embodiment of the invention, $$IC_c^n$$

can be used as the likelihood value for class c at terminal node n. That is, $$L_{\text{class\_c}^n} = IC_c^n.$$

In one embodiment of the invention, a regulated confidence value corresponding to class c for an input sample $X_{input}$, $\text{Confidence}_c(X_{input})$, is determined by:

$$\text{Confidence}_c(X_{input}) = \sum_{j \in \text{terminal\_nodes}} \prod_{s \in \text{branches\_to\_j}} L\_s(X_{input}) IC_{\text{class\_c}}^j$$

The classification process can be performed based upon the confidence determined for each input (Xinput). The Classification result, C*, can be determined by the following rule $$C^*(X_{input}) = \arg\underset{c}{\text{MAX}}\, \text{Confidence}_c(X_{input})$$

II.3 Tree Pruning Regulation by Information Integration

To avoid the over-fitting of data, a decision tree is often pruned (Breiman L., Friedman J. H., Olshen R. A. and Stone C. J., "Classification And Regression Trees", Chapman & Hall/CRC, 1984 pp 59-62; Quinlan J. R., "C4.5 Programs For Machine Learning", Morgan Kaufmann, 1993 pp 35-43). Discarding one or more sub-trees and replacing them with terminal nodes usually simplifies decision trees. There are two methods of tree pruning in the prior art approach, cost-complexity pruning and reduced-error pruning. These methods evaluate the error criteria for the samples that fall into a non-terminal node preceding a pair of terminal nodes. If the error criteria result is in favor of the combined nodes, the sub-tree is pruned.

The following steps can accomplish regulated pruning:
1. For each non-terminal node of the tree having two descending terminal nodes,
   a. Determine the accuracy to training samples under the following two conditions:
      i. Consider the two terminal nodes separately and determine the accuracy a1
      ii. Combine the two terminal nodes into one node and determine the accuracy a2
   b. If a1>a2, no pruning of the terminal node pairs
   c. Otherwise, prune the terminal nodes by combing the two terminal nodes and converting the associated non-terminal nodes into one terminal node
   d. If changes occur in the previous iteration, repeat process 1. Otherwise, the pruning process is completed.

In a preferred embodiment of the invention, the accuracy criteria for tree pruning are regulated using the integrated confidence values as a regulated measure to achieve a good balance between local and global characteristics.

When two terminal nodes are pruned, they are replaced by their parent node and therefore will inherent all characteristics (local counts, local population statistics, global counts and global population statistics) of the parent node.

In addition, this information integration invention enables specialized pruning for unreliable nodes. Comparing the local, global, count and population confidences $$LC_c^n, LP_c^n, GC_c^n, GP_c^n$$

can identify unreliable nodes. In a preferred embodiment of the invention, four confidence ratios are defined:

$$\frac{LP_c^n}{(LC_c^n + LP_c^n)}, \frac{GC_c^n}{(LC_c^n + GC_c^n)}, \frac{GP_c^n}{(LP_c^n + GP_c^n)}, \frac{GP_c^n}{(GC_c^n + GP_c^n)}, \frac{LP_c^n}{(LC_c^n + LP_c^n)}$$

measures the local population effect. If the value is significantly different from 0.5, there is a mismatch between local count and local population based decision. So the results may not be reliable. In the preferred embodiment of the invention, a local population reliability measure $R_{LP}$ is defined as $$R_{LP} = 1 - 2 * \left| \frac{LP_c^n}{(LC_c^n + LP_c^n)} - 0.5 \right| \cdot \frac{GC_c^n}{(LC_c^n + GC_c^n)}$$

measures the global and local count difference effect. If the value is significantly different from 0.5, there is a mismatch between the global and local count based decision. So the results may not be reliable. In one embodiment of the invention, a count reliability measure $R_c$ is defined as $$R_c = 1 - 2 * \left| \frac{GC_c^n}{(LC_c^n + GC_c^n)} - 0.5 \right| \cdot \frac{GP_c^n}{(LP_c^n + GP_c^n)}$$

measures the global and local population effect. If the value is significantly different from 0.5, there is a mismatch between global and local population based decisions. So the results may not be reliable. In one embodiment of the invention, a population reliability measure $R_P$ is defined as $$R_P = 1 - 2 * \left| \frac{GP_c^n}{(LP_c^n + GP_c^n)} - 0.5 \right| \cdot \frac{GP_c^n}{(GC_c^n + GP_c^n)}$$

measures the global population effect. If the value is significantly different from 0.5, there is a mismatch between global count and global population based decisions. So the results may not be reliable. In one embodiment of the invention, a global population reliability measure $R_{GP}$ is defined as $$R_{GP} = 1 - 2 * \left| \frac{GP_c^n}{(GC_c^n + GP_c^n)} - 0.5 \right| \cdot$$

In one embodiment of the invention, a combined reliability measure R can be defined as:

$$R = w_{LP} R_{LP} + w_c R_c + w_P R_P + w_{GP} R_{GP}$$

Where $w_{LP}$, $w_c$, $w_P$, $w_{GP}$ are combination weighting factors.

Those skilled in the art should recognize that other reliability measures and other methods of reliability combination such as nonlinear functions can be used. Some examples are as follows:

$$1 - 2 * \left| \frac{GP_c^n}{(LC_c^n + GP_c^n)} - 0.5 \right|, 1 - 2 * \left| \frac{GC_c^n}{(LP_c^n + GC_c^n)} - 0.5 \right|.$$

Furthermore, other methods of reliability combination such as non-linear functions can be used in the invention.

A new tree pruning method is defined in one embodiment of the invention that determines the combined reliability R for the maximum class c of a terminal node n as a regulated measure. Where maximum class c has the highest $$IC_c^n$$

value among all classes in n. If R increases after combining two terminal nodes, the nodes are combined (therefore, terminal nodes are pruned). In another embodiment of the invention, the reliability R for the maximum class c is integrated with the classification accuracy (a) as the regulated measure (RA) for tree pruning. In one embodiment of the invention, the combination is done by the following rule $$RA = w_R R + w_a a.$$

Where $w_R$ and $w_a$ are weighting factors. Those skilled in the art should recognize that other methods of combination such as nonlinear functions can also be used.

II.4 Tree Generation Regulation by Information Integration

A prior art binary decision tree construction procedure is detailed in I.2. The information integration method of this invention can be used in the up-front tree generation process to generate highly robust decision tree classifiers. This is accomplished by using additional information in the partition selection step (step 3 of I.2). In one embodiment of the invention, $$IC_c^n$$

value for the maximum class $c^{n*}$ detailed in II.2 is used as the evaluation function for the partition selection. In another embodiment of the invention, RA value $c^{n*}$ (detailed in II.3) is used as the evaluation function for the partition selection.

Those skilled in the art should recognize that the embodiments described above are not exhaustive, and that other criteria and weight determination derived from additional information can be used as the evaluation function for the partition selection in the decision tree construction process.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different weighting, confidence determination, and accuracy assessment processes, and that various modifications, both as to the method details and selection procedures, can be accomplished without departing from the scope of the invention itself.

What is claimed is:

1. A computerized method in decision system applications for collecting global or population characteristics for decision tree regulation to achieve robust decisions in spite of the application dynamics and/or errors in training data comprises the following steps:
   (a) Step for inputting an existing decision tree encapsulating the knowledge acquired from practical applications;
   (b) Step for inputting a set of training samples;
   (c) Step for using the decision tree and the training samples to determine and output a decision characteristic for at least one decision tree node, said characteristic selected from the group consisting of global characteristics and population characteristics calculating weighted global class training sample proportion of the at least one decision nodes;
   (d) Step for receiving an input sample; and
   (e) Step for using the characteristic output to regulates the decision tree for making robust decisions on the input sample in decision system applications such as automatic process control, automatic target recognition and machine vision.

2. The method of claim 1 wherein the global characteristics include global counts calculating weighted class training sample count for samples that are up to k layers above a node.

3. The method of claim 1 wherein the population characteristics include local population statistic calculating weighted class training sample proportion of the at least one decision node.

4. A computerized method in decision system applications for classification regulation by information integration to achieve robust decisions in spite of the application dynamics and/or errors in training data comprises the following steps:
   (a) Step for inputting an existing decision tree encapsulating the knowledge acquired from practical applications;
   (b) Step for inputting a plurality of decision characteristics selected from the group consisting of global characteristics and population characteristics calculating weighted global class training sample proportion from at least one terminal node of the decision tree;
   (c) Step for determining the confidence value for each of the plurality of said characteristics as the ratio between characteristic value of a class and that of all classes;
   (d) Step for determining and outputting an integrated confidence value for each class of said at least one terminal node;
   (e) Step for receiving an input sample; and
   (f) Step for integrating the confidence value using local and consistent global information for making robust decisions on the input sample in decision system applications such as automatic process control, automatic target recognition and machine vision.

5. The method of claim 4 wherein the global characteristics and population characteristics are selected from the group consisting of global counts, local counts, global population statistic, and local population statistic calculating weighted class training sample proportion of the at least one terminal node of the decision tree.

6. The method of claim 4 wherein the confidence value is selected from the set consisting of local count confidence, local population confidence, global count confidence and global population confidence wherein the local count confidence for class c in a terminal node n is defined as $$LC_c^n = \frac{N_c^n}{\sum_{c \in All\_Classes\_in\_n} N_c^n}.$$

the local population confidence for class c in a terminal node n is defined as $$LP_c^n = \frac{P_c^n}{\sum_{c \in All\_Classes\_in\_n} P_c^n}.$$

the global count confidence for class c in a terminal node n is defined as $$GC_c^n = \frac{G_c^n}{\sum_{c \in All\_Classes\_in\_n} G_c^n};$$

the global population confidence for class c in a terminal node n is defined as $$GP_c^n = \frac{g_c^n}{\sum_{c \in All\_Classes\_in\_n} g_c^n}.$$

7. The method of claim 4 wherein the global characteristics have a global context coverage that is adjusted using different layer depths wherein the global context is from layers above a node determined by the different layer depths.

8. A computerized method in decision system applications for decision tree pruning regulation by information integration to achieve robust decisions in spite of the application dynamics and/or errors in training data comprises the following steps:
- (a) Step for inputting an existing decision tree encapsulating the knowledge acquired from practical applications;
- (b) Step for inputting a set of training samples;
- (c) Step for generating a regulated measure using the decision tree and the training samples selected from the group consisting of integrated confidence values and reliability measures comparing local, global, count and population confidences;
- (d) Step for determining the accuracy values for a non-terminal node of the decision tree having two descending terminal nodes using the regulated measure under two separate nodes or combined node conditions;
- (e) Step for pruning the terminal nodes by combing the two terminal nodes and converting the associated non-terminal nodes into one terminal node if combined node accuracy value is greater than the two separate node accuracy value; and
- (f) Step for outputting a simplified decision tree for avoiding over-fitting of data allowing robust decisions on new data in decision system applications such as automatic process control, automatic target recognition and machine vision.

9. The method of claim 8 wherein the reliability measures include a local population reliability measure $R_{l,P}$ defined as $$R_{l,P} = 1 - 2 * \left| \frac{LP_c^n}{(LC_c^n + LP_c^n)} - 0.5 \right|.$$

10. The method of claim 8 wherein the reliability measures include a count reliability measure $R_c$ defined as $$R_C = 1 - 2 * \left| \frac{GC_c^n}{(LC_c^n + GC_c^n)} - 0.5 \right|.$$

11. The method of claim 8 wherein the reliability measures include a population reliability measure $R_c$ defined as $$R_P = 1 - 2 * \left| \frac{GP_c^n}{(LP_c^n + GP_c^n)} - 0.5 \right|.$$

12. The method of claim 8 wherein the reliability measures include a global population reliability measure $R_{Gr}$ defined as $$R_{GP} = 1 - 2 * \left| \frac{GP_c^n}{(GC_c^n + GP_c^n)} - 0.5 \right|.$$

13. A computerized method in decision system applications for decision tree generation regulation by information integration to achieve robust decisions in spite of the application dynamics and/or errors in training data comprises the following steps:
- (a) Step for inputting a set of training samples acquired from practical applications;
- (b) Step for generating set of candidate thresholds for at least one node;
- (c) Step for partitioning data at a candidate threshold;
- (d) Step for calculating an evaluation function selected from the set consisting of integrated confidence value and reliability measures comparing local, global, count and population confidences;
- (e) Repeat steps (c) and (d) for a plurality of partitions and select the partition for the node as the one that maximizes the evaluation function;
- (f) Step for outputs a highly robust decision tree classifier using the partition for the node;
- (g) Step for receiving an input sample; and
- (h) Step for using the highly robust decision tree classifier for robust decisions on the input sample in decision system applications such as automatic process control, automatic target recognition and machine vision.

* * * * *